2,964,406
INHIBITING MICROBIOLOGICAL GROWTH IN FERMENTATIONS EMPLOYING YEAST

Frede B. Strandskov, Verona, and John B. Bockelmann, Tenafly, N.J., assignors to The F. & M. Schaefer Brewing Co., Brooklyn, N.Y.

No Drawing. Filed Dec. 8, 1953, Ser. No. 397,052

7 Claims. (Cl. 99—43)

The present application is a continuation-in-part application of our co-pending application Serial No. 381,108, filed September 18, 1953, and of our co-pending application Serial No. 369,959, filed July 23, 1953, now Patent No. 2,798,811 of July 9, 1957.

The present invention relates to the control of microbiological growth in fermentations employing yeasts and to an improvement in the fermenting activity of yeast by the addition of a combination of the two antibiotics, polymyxin and penicillin, in controlled small amounts to the fermentation medium, or to the pitching yeast, or to the nutrient medium prior to the addition of the yeast.

In our co-pending application Serial No. 336,873 (now abandoned) and which is continued in our continuation-in-part application Serial No. 381,108, we disclosed that the gram negative rod *Flavorbacterium proteus* can be completely eliminated in a brewery fermentation by surprisingly low concentrations of the antibiotic polymyxin.

The bacteria that commonly infect brewer's yeast and brewery beer fermentations are gram negative rods *Flavorbacterium proteus*, gram positive cocci *Pediococcus damnosus* and gram positive rods *Lactobacillus pastorianus* or species that are closely related to the above. Of these, the one most commonly found and the one that is capable of growing most rapidly duirng a normal beer fermentation is the gram negative rod *Flavorbacterium proteus*. This organism is almost universally present in brewery beer fermentations, and when it is present in sufficiently high numbers, it produces a foreign odor in beer, which resembles that of cooked parsnips (1) Shimwell, J. L., 1948, Wallerstein Lab. Comm. 11, 135. This is, of course, extremely undesirable.

The common method used in trying to control this type of infection is to treat the infected yeast, the pitching yeast, with a rather weak aqueous solution of an acid such as phosphoric or tartaric acid. This is done when the bacterial contamination reaches a level that is considered dangerous and this acid wash does effectively reduce the level of bacterial contamination but the infection is not completely eliminated. This treatment reduces the number of viable infecting bacteria but this reduction is usually only of the order of 90 percent. The remaining 10 percent of the bacterial infection begins to multiply again as soon as the treated yeast is used in a subsequent fermentation. Furthermore, this acid and washing treatment is very hazardous since the difference between the optimum pH level for bactericidal action and the pH level at which the yeast itself becomes affected by the bacteria present is only 0.3 of a pH unit.

Thus, this acid washing treatment of the yeast provides at best, a yeast infected with up to 10% of viable bacteria, which bacteria are in an acidic environment favorable for their multiplication so as to negative the purification accomplished, particularly where the so-treated yeast may be stored prior to its use in fermentation, under conditions to change the pH and to favor the growth of the bacteria. This prior art treatment has required the brewer to maintain yeast propagating units which are kept under carefully controlled conditions to keep the yeast free from bacterial infection. This has been costly and burdensome. Frequently, despite the careful control which has been maintained, bacterial contamination of the yeast still occurs in inexplicable fashion, and the fermentation bath must be discarded.

The only method which existed heretofore for the complete elimination of the bacterial infection of brewers yeast is to discard the infected yeast and to replace it with a yeast that has been propagated in such a manner that it has been kept free of bacterial infection. Most breweries are not equipped to propagate yeast in this manner and to repeatedly purchase such pure yeast is, of course, quite costly.

In our co-pending application Serial No. 381,108 the inhibiting effect of the antibiotic polymyxin is described with reference to the fermentation of beer and ale using the yeast *Saccharomyces carlsbergensis* and with respect to industrial fermentations utilizing the yeast *Saccharomyces cerevisiae* or the yeast *Schizosaccharomyces*. In this application there is also mentioned that the same effect on the stimulation of fermentation and the inhibition of *Flavorbacterium proteus* is observed when mixtures of other antibiotics and polymyxin are added to the fermentation medium, either with the pitching yeast or in the medium itself. Polymyxin may be admixed with one or more of such antibiotics as bacitracin or terramycin and provide the new result of that application, the improvement obtained being greater than that observed when these latter antibiotics are employed alone.

Our co-pending application Serial No. 369,959, mentions the control of microbiological growth in beer, particularly in finished beer in a bottle, can or other container by means of the antibiotics, polymyxin and/or thiolutin, alone or in association with such antibiotics as penicillin, streptomycin and the like.

The co-pending application Serial No. 369,959 is also directed to the general applicability in malt fermentations of certain combinations of two or more of the antibiotics, such as thiolutin, polymyxin, and terramycin.

Wallerstein Laboratories Communications, March 1953, at page 95, mentions attempts by Russian workers to control microbiological growth in alcohol fermentation by the use of penicillin (Chem. Abstracts, 46, 13:6320 (1952)).

Lund in a discussion of a paper by Baetsle during the proceedings of the International Congress of Microbiology at Copenhagen, Denmark, in 1947, called attention to the usefulness of penicillin against beer spoilage lactic acid bacteria.

However, penicilin, per se, has not been found to be effective for the control of the micro-organismis associated with beer spoilage.

The present application is specifically directed to the combination of polymyxin and penicillin as disclosed in our co-pending application Serial No. 369,959 specifically and as additionally disclosed herein.

An object of the present invention is to provide a method for stimulating the fermentation of beer or ale by adding the antibiotics penicillin and polymyxin, each in an amount of at least 0.05 gamma per ml. of the fermentation medium either prior to or after the yeast has been added or added with the yeast to give such concentration in the fermentation medium, whereby the gram negative rods, gram positive cocci and gram positive rods associated as impurities with the materials used during fermentation are completely eliminated and the fermentation is accelerated without any substantial increase in the growth of the yeast cells.

A further object of the present invention is to provide a method for stimulating the industrial alcohol fermentation by adding the antibiotics penicillin and polymyxin, each in an amount of at least 0.05 gamma per ml. of the fermentation medium either prior to or after the yeast has been added or added with the yeast to give such concentration in the fermentation medium, whereby the gram negative rods, gram positive cocci and gram positive rods associated as impurities with the materials used during fermentation are completely eliminated and the fermentation is accelerated without any substantial increase in the growth of the yeast cells.

Different conditions are recognized as necessary in the fermenting of malt beverages, such as beer, ale, porter and stout than in the fermentation of industrial alcohol as carried out by the distilling industries.

The fermentation of beer in an industrial installation, because of the size of the equipment and the volumes of materials used, is extremely vulnerable to bacterial infection. This fermentation in the brewery or distillery is usually carried on at a relatively low temperature, e.g. temperatures of from 50 to 59° F. in order to avoid excess yeast activities of other types and particularly undesirable yeast and bacterial growth. In certain types of beer fermentation, temperatures up to 70° F. are used.

Because of the low temperature at which the beer fermentation is usually carried out, the low pH value of the fermenting beer, the anaerobic conditions in the fermenter and the antiseptic value of the hop extracts in solution only a few species of bacteria are able to grow in and survive during the fermentation process, and the bacterial contaminant commonly encountered is the gram negative rod, *Flavobacterium proteus*, or its closely related gram negative species.

The yeast commonly employed in beer is *S. carlsbergensis*, whereas the brewery yeast used in the brewing of ale is a strain of *S. cerevisiae*. The former is a bottom yeast whereas the latter is a top fermenting yeast. Such other yeasts as Saaz yeast or *S. monacensis* may be used as typical bottom yeasts with equally good results.

In the fermentation of molasses, sugar can syrup or mashes (sweet or sour) for the manufacture of rye, bourbon, wheat, malt, rye malt, or corn whiskey, strains of *Saccharomyces cerevisiae* or of other yeasts, such as species of Schizosaccharomyces may be used to pitch (inoculate) the mash.

The progress of the fermentation in the manufacture of beer or ale may be readily followed by observing the reduction in the pH of the beer, the reduction in the gravity of the beer in degrees Plato and by determining the bacterial count of the fermentation medium under the carefully controlled conditions of fermentation which are scrupulously followed for the normal fermentation operation. At the same time, the concentration of yeast cells in the fermenting medium may be observed at the start, during the fermentation, and at the finish of the fermentation. In accordance with the observations typified by the illustrative examples which are set forth below, certain generalized conclusions have been found concerning the effect of the antibiotics penicillin and polymyxin separately and the synergistic effect of the antibiotics when used in combination.

The temperature of fermentation is an important factor as mentioned above. The fermentation of beer is preferred at a relatively low temperature of from 50–59° F., the temperature rising from the former to the latter figure during a fermentation period of from 4 to 5 days. In the bottom fermentation method, the conditions in the fermentation medium are anaerobic and the hop extract contains an antiseptic principle which eliminates substantially all of the bacteria except *Flavobacterium proteus*.

Ale is fermented at a somewhat higher temperature of from 58–74° F. and the temperature is permitted to rise a few degrees each day in substantially the same manner as in beer fermentation. Although the fermentation of bottom fermenting yeasts is usually carried out at from 6–12° C. for a period of from 8 to 10 days and of a top fermenting yeast at from 14–23° C. for about 5 to 7 days, the more limited temperature ranges indicated in degrees Fahrenheit above are preferred and the time of fermentation is shortened in view of the high purity of the strains of starting yeast employed.

Towards the finish of the fermentation of the yeast in beer or ale manufacture, a definite change takes place in the wort and the yeast flocculates and commences to settle. In beer, the yeast settles to the bottom and in al the change known as the "break" occurs when the scum at the top of the medium thickens. In a beer fermentation whether or not the antibiotic is present, the "break" usually occurs between the 3rd and 4th days. In an ale fermentation whether or not the antibiotic is present, the "break" occurs between the 2nd and 3rd days. In the fermentation of a sweet or sour mash or syrup, less time is commonly used with the sweet method than with the sour method, a similar "break" is observed around the 2nd day. A higher yield of alcohol is obtained from the sour method. Fermentation temperatures of from 70° F. to 96° F. are usual in these whiskey fermentations.

The course of these whiskey fermentations is substantially complete in about 2 days when the fermentation temperature at the upper part of the range close to 96° F., is employed. In practice, however, longer times of fermentation are preferred in the middle or lower part of the temperature range. Bacterial contamination inevitably occurs at the higher temperatures, which is very difficult to control, despite the usual employment of disinfecting materials and the careful observation of high standards of cleanliness in the selection of materials and in carrying out the fermentation. Adjustment of the acidity of the mash to an acid pH assists in controlling the bacterial contamination and for this reason the sour method is preferred.

Bacterial contamination occurs in both the sweet mash and sour mash fermentation to impart undesirable flavors and odors and to introduce undesirable fermentation by-products into the fermented mash, which impurities, undesirable flavors and odors carry over into the distilled product. The still residues are frequently so contaminated as to have substantially no value as cattle feed. The efficiency of the fermentation is reduced by the formation of substantial quantities of suspended bacteria which tend to occlude unfermented carbohydrate and which thereafter convert the occluded material into undesirable by-products. Filtration procedures are complicated by the presence of large quantities of the suspended bacteria. This results in later sedimentation in the distillate and in nonuniformity of the distilled material despite careful attention to control of conditions of fermentation. Expert supervision is frequently necessary since the bacterial contamination sometimes floats to the surface, sometimes settles and not infrequently remains suspended so that its settling must be accomplished.

The above difficulties are completely obviated by adding the antibiotics, penicillin and polymyxin, each in an amount of 0.05 gamma per ml. of the mash throughout the effective fermentation temperature range. The activity of the yeast is enhanced. The recovered yeast which settles after the fermentation is complete, is free from bacterial infection and may be employed in the next batch in contrast to the frequent requirement that it be discarded where no addition of the antibiotics is made.

The same benefit is obtained if the antibiotics are employed with the pitching yeast or are added to the mash before the yeast is added.

In the fermentation of beer using a bottom fermenting yeast, the wort is adjusted to a starting pH of 5.1 and a starting wort gravity of 11.7° Plato to 12.3° Plato is preferred. Degrees Plato is equivalent to percentage sucrose in water solution and is also for all practical purposes equivalent to the percentage of extract in wort or beer. The relationship of degrees Plato to specific gravity is published in table form by the American Society of Brewing Chemists.

The wort (beer or ale fermentation) after boiling and before pitching is cooled rapidly from about 190° F. to about 49° F. This results in the precipitation of a large amount of protein material commonly referred to as trub. In order to avoid the presence of the precipitated trub, which imparts a bitter flavor to the beer, in the fermenters during the fermentation, the cooled wort is allowed to stand in a settling tank for about 12 hours before it is pumped into the fermenter. During this 12 hour period most of the trub settle to within about 10 inches of the bottom of the tank.

It is, however, dangerous to let this cooled wort stand exposed for such a long period of time as it is an excellent growth medium for bacteria, and bacterial contamination is apt to occur. For that reason, yeast is added to the cooled wort as it is being pumped to the settling tank so that the fermentation is started almost immediately and this fermentation is relied upon in practice to retard the bacetrial growth. The organisms that cause spoilage of wort are commonly referred to as "termo" bacteria. They are short gram negative rods usually of the family Enterobactereaceae. Reference to these organisms can be found in Wallerstein Laboratories Communications, II, 135 (1948).

The yeast does, however, tend to settle out with the trub and the beer can therefore not be pumped over into the fermenter until the fermentation has become sufficiently vigorous to re-suspend the yeast. This evolution of $CO_2$ which re-suspends the yeast results, however, also in the re-suspension of some of the trub which then is carried over into the fermenter and imparts bitterness to the brew.

By the addition of the antibiotic polymyxin to the cooled wort in concentrations of at least 0.05 gamma per ml. the bacterial contamination is controlled and the wort may be allowed to stand in the settling tank without the addition of yeast. As there is no active fermentation going on (no $CO_2$ being evolved) the settled trub is not disturbed. Less of it is pumped into the fermenter and it settles in a better physical condition.

The data in the following table show the effect of polymyxin on wort held at 48° F., the regular wort settling temperature. The data show that the growth of this naturally occurring infection is completely inhibited by 0.05 gamma/ml. of polymyxin.

TABLE I

| Polymyxin Gamma/ml. | 48 hours | |
|---|---|---|
| | Odor | Plate Count (termo) |
| 0 | termo | 22,500,000 |
| 0.01 | termo | 31,000,000 |
| 0.02 | termo | 5,300,000 |
| 0.05 | normal | ¹ 1,500 |
| 0.10 | normal | ¹ 2,800 |

¹ Primarily yeast colonies.

Penicillin, itself, is ineffective in the concentration as is used with polymyxin for the inhibition of the growth of these termo bacteria. However, the combination of 0.10 gamma/ml. of penicillin with 0.05 gamma/ml. of polymyxin provides for complete inhibition of the growth of the termo bacteria and permits the latter pitching to be carried out without the necessity of further additions of these antibiotic agents to obtain the improvement in the enhancement of fermentation and the reduction of pH as shown in the examples below.

In the manufacture of ale, the wort is pitched with about 1 pound of yeast to about 50 gallons and the concentration in the fermentation is about $6.0-6.2 \times 10^6$ yeast cells per ml. In a controlled fermentation in which no antibiotic is added, the yeast count increases to about $18-20 \times 10^6$ cells per ml. 24 hours after pitching, about $26-43 \times 10^6$ cells per ml. 48 hours after pitching, about $39-46 \times 10^6$ cells per ml. 72 hours after pitching and about $15-24 \times 10^6$ cells per ml. 96 hours after pitching, the "break" occurring between 72 hours and 96 hours.

The higher values of yeast growth are observed at higher carbohydrate concentrations of the starting wort (higher gravities in degrees Plato). The addition of 0.05 gamma of polymyxin per ml. to the fermentation medium in the manner as indicated above does not materially change the yeast count during the course of the fermentation and the "break" is observed similarly between the 3rd and 4th days. Increasing the amount of polymyxin to 1.6 gamma per ml. provides substantially no improvement over 0.05 gamma per ml. on the yeast growth and activity.

Remarkably, the addition of at least 0.05 gamma of polymyxin to the fermenting beer improves the subsequent filtration, permits the recovery of the yeast cells in uncontaminated form and there is no detectable trace of polymyxin which can be found in the filtered beer or recovered yeast using the standard test methods available. Polymyxin in combination with penicillin also exhibits the property that these antibiotics are lost after filtration so that they cannot be detected by standard test methods in the filtered beer or in the recovered yeast. Thus there is prevented introducing a dangerous reagent to convert a potable beverage or edible yeast into a drug.

The normal infection encountered in malt fermentation is of the order of several hundred thousands to a few million per ml. of gram negative rods above identified, and similar numbers of gram positive rods and cocci above identified, either from the materials used or from secondary infection during fermentation. An effective dosage of polymyxin to substantially completely eliminate gram negative infection is about 0.05 gamma/ml. Doubling or further increasing the dosage provides no additional benefit and introduces the disadvantage that small amounts of polymyxin may be carried over into the beer or yeast after fermentation. Penicillin has no such utility with respect to the gram negative rods which are the principal source of difficulty in malt fermentations. Although penicillin affects lactic acid bacteria, penicillin is inactivated under the acid conditions of fermentation. The introduction of large amounts of penicillin appears to have no advantage. It is not unlikely that the inactivation may be associated with the occurrence of penicillinase. Accordingly, penicillin has been abandoned since it introduces an impurity into a fermentation process wherein requirements for purity must be strictly observed.

The action of polymyxin in the preferred dosage reaches its height of effectiveness about 24 to 48 hours after pitching with respect to the fermentation process carried out. Contrasted to this, several hundred more gamma of penicillin per ml. added under the same conditions become deactivated, have no effect upon *Flavobacterium proteus* and produce no benefit with respect to improving the fermentation. Instead, the use of penicillin alone results in the observation of serious contamination after the second or third day of the fermentation process which is the critical period of fermentation with regard to the optimum conditions for maximum conversion of the carbohydrate to alcohol. This critical period is likewise the period which is most susceptible to bacterial contamination.

It is surprising that the combination of penicillin and polymyxin each in an amount of 0.05 gamma per ml. should produce an improved result with respect to the control of microbial growth and to the enhancement of fermentation in view of the ineffectiveness of penicillin itself and in view of the lesser effectiveness of the same amount of polymyxin per se. Polymyxin in an amount of 0.10 gamma per ml. produces substantially the same enhancement of fermentation as does polymyxin in a dosage of 0.05 gamma per ml. The reduction in pH 48 hours after pitching is about 0.2 to 0.3 unit greater than the control. After 72 hours the reduction in pH is about 0.2 to 0.3 unit greater than the control. The drop in gravity in degrees Plato is about 1 unit less at the end of the 2nd day and about 1 unit less at the end of the 3rd day than the control. The end gravity is reached 1 day ahead of the control, using polymyxin in either of these small doses.

In contrast to this, the use of polymyxin (0.05 gamma per ml.) and penicillin (0.10 gamma per ml.) results in a decrease of gravity (degrees Plato) of 1 unit less than the control at the end of the 2nd day and 2 units less at the end of the 3rd day. Thus, the same dosage of polymyxin is less effective in the reduction of gravity at the end of the 3rd day than is the prescribed dosage of polymyxin and penicillin. Bacterial contamination is substantially eliminated at the end of 24 hours so that the combined anibiotics are just as effective as polymyxin alone in the same dosage and yeast growth is not adversely affected in any way.

Penicillin itself, when added to the wort in beer or ale after boiling and before pitching does not provide any advantage with respect to the finished beer or ale. The remarkable improvement obtained with the use of polymyxin alone and polymyxin with penicillin, each in a dosage of 0.05 gamma/ml. has already been described. A real benefit is obtained in eliminating bitterness from the beer which is due to trub being carried over from the precipitation step. It has been suggested to use a sterile container for the precipitation step which is fitted with ultra-violet lamps or equivalent germicidal devices. This practice is completely obviated in accordance with the present invention and the advantages of the invention in this respect are manifest.

As stated above, the higher temperature fermentation used in the fermentation of ale has the disadvantage of increased bacterial contamination. In practice, the bacteria are floated off the top of the fermenting ale and large quantities of ale are lost. The addition of small amounts of penicillin and polymyxin substantially eliminates this loss of ale and at the same time provides for greater uniformity and higher quality of flavor in the finished ale.

The elimination of the bacterial infection provides for the corresponding elimination of unfavorable flavors and odors which are associated with such infection in the brewery. The enhancement in fermentation which is observed for the combination of antibiotics in the fermentation of beer is likewise observed in the use of the combination for the fermentation of ale. The control of bacterial infection is more important at the higher temperatures used in ale fermentation which provide a favorable environment for the spread of the infection. An improvement in the reduction of pH as compared with the control and with polymyxin alone and also in the reduction of gravity is found when the combination of antibiotics are used as compared with the control or with polymyxin per se. Penicillin per se is even more unsatisfactory under ale fermenting conditions than under beer fermenting conditions.

In industrial alcohol fermentation the combination of antibiotics is of particular value since the use of small controlled amounts completely controls undesirable microbiological growth and renders unnecessary the use of such disinfectants as ammonium bifluoride. At the same time the hazard of secondary infection in the preferred 7 day fermentation is substantially eliminated and better control is had by producing a more uniform distilled product for the subsequent aging process.

The invention may be more readily understood in view of the following illustrative examples:

EXAMPLE 1.—THE CONTROL (BEER FERMENTATION)

Three liters of fermenting beer from a plant fermenter which had been pitched during the preceding three hours with a yeast (*Saccharomyces carlsbergensis*) infected with approximately 200,000 cells of *Flavobacterium proteus* type bacterial rods per milliliter, were employed. The original gravity of this beer was 11.7 degrees Plato, the original pH was 5.1 and the original yeast count was six million cells per milliliter. The fermenter is suspended in a temperature controlled water bath and the temperature is adjusted each day to conform as nearly as possible to plant fermentation temperatures ranging from about 50° F. to 59° F. The fermentation of the beer, i.e. the filtered infusion of the starches, sugars, and hops after the heating of malted barley, is started at 50° F. and the temperature is permitted to rise but 2° per day, until on the fourth day a temperature of about 59° F. is attained, the heat of fermentation accounting for the temperature rise, and cooling being effected when necessary. The day after the fermenter is filled, and on each succeeding day for four days, aliquots for analysis are withdrawn from a standard depth of the fermenters with a pipette.

The results of these analyses on the second, third, fourth and fifth days after the fermentation is started were respectively: yeast count $\times 10^{-6}$ per milliliter equals 18.8, 26.0, 39.2 and 15.2; pH 4.69, 4.45, 4.21 and 4.10; degrees Plato 10.39, 8.00, 5.74 and 3.30.

EXAMPLE 2

In Example 2, the procedure and conditions are the same as in Example 1 with the exception that a water solution of polymyxin is added to give a final concentration of polymyxin in the fermenting beer of 0.05 gamma per milliliter.

The results of the analysis on the second, third, fourth and fifth days after the fermentation had been started were respectively: yeast count $\times 10^{-6}$ per milliliter equals 17.5, 30.5, 41.0 and 12.2; pH 4.67, 4.23, 4.05 and 4.00; degrees Plato 10.3, 7.5, 4.95 and 3.05. Bacterial infection falls to substantially zero on the second day (starting infection 203,000 per ml.).

EXAMPLE 3

In Example 3, the procedure and conditions are the same as in Example 1 with the exception that a water solution of polymyxin was added to give a final concentration of polymyxin in the fermenting beer of 0.10 gamma per milliliter.

The results of the analysis on the second, third, fourth and fifth days after the fermentation had been started were respectively: yeast count $\times 10^{-6}$ per milliliter equals 18.0, 30.5, 42.0 and 12.2; pH 4.67, 4.22, 4.04 and 3.99; degrees Plato 10.3, 7.5, 4.95 and 3.05. Bacterial infection falls to substantially zero on the second day (starting infection 203,000 per ml.).

EXAMPLE 4

In Example 4, the procedure and conditions are the same as in Example 1, with the exception that a water solution of polymyxin was added to give a final concentration of polymyxin in the fermenting beer of 0.15 gamma per milliliter.

The results of the analysis on the second, third, fourth and fifth days after the fermentation had been started were respectively: yeast count $\times 10^{-6}$ per milliliter equals 20.2, 30.5, 44.9 and 12.2; pH 4.62, 4.22, 4.04 and 3.98; degrees Plato 10.40, 7.65, 4.92 and 3.06. Bacterial infection falls to substantially zero on the second day (starting infection 203,000 per ml.).

EXAMPLE 5

In Example 5, the procedure and conditions are the same as in Example 1 with the exception that a water solution of polymyxin is added to give a final concentration of polymyxin in the fermenting beer of 13.0 gamma per milliliter.

The results of the analysis on the second, third, fourth and fifth days after the fermentation had been started were respectively: yeast count×$10^{-6}$ per milliliter equals 19.5, 29.7, 39.3 and 16.2; pH 4.65, 4.14, 4.02 and 3.98; degrees Plato 10.22, 7.28, 4.74 and 3.00. Bacterial infection falls to substantially zero on the second day (starting infection 203,000 per ml.).

EXAMPLE 6

In Example 6 the procedure and conditions are the same as in Example 1 except that a water solution of penicillin is added to give a final concentration of penicillin in the fermenting beer as follows: 0.5 gamma per ml., 10 gamma per ml., 15 gamma per ml. and 120 gamma per ml.

From the results of the analysis on the 2nd, 3rd, 4th and 5th days after the fermentation was started, the yeast count×$10^{-6}$ per milliliter was substantially the same as the yeast count observed in the control of Example 1. The pH values likewise are substantially the same as in Example 1 and no appreciable difference is observed in the gravity values in degrees Plato. The bacterial infection at the start is about 203,000 per ml. In the control, the bacterial count (substantially entirely gram negative *Flavobacterium proteus*) dropped to about 194,000 per ml. on the 3rd day and the value at the end of the 5th day varied from about 100,000 to about 200,000 per ml. The addition of penicillin even in amounts up to 120 gamma per ml. in the present example made no change in the bacterial count. The presence of penicillin could not be detected in the finished fermentation or in the yeast cells separated therefrom when additions of 0.05 gamma, 0.10 gamma and 0.15 gamma per ml. were added. Accordingly the deactivation of the penicillin is shown in these dosages and no improvement for the control of the gram negative rods is provided by the use of this antibiotic alone.

EXAMPLE 7

In Example 7, the procedure and conditions are the same as in Example 6 with the exception that the additions of 0.05 gamma, 0.10 gamma, 0.15 gamma and 120 gamma are made to an ale fermentation which is carried out with a starting temperature of 58° F. and is permitted to go at the end of 60 hours to a temperature of 74° F. employing the yeast, *Saccharomyces cerevisiae*.

The control fermentation under the above temperature conditions employs about 350 pounds of this ale pitching yeast to about 600 barrels of wort (each barrel of wort contains 31 gallons). The starting pH of the wort is about 4.95. The pH drops after about 6 hours to about 4.92, after about 12 hours to about 4.86, after about 24 hours to about 4.66, after about 36 hours to about 4.18 and after 60 hours to about 3.94. The gravity in degrees Plato in the control at the start is about 12.30. No drop is observed after 6 hours. After 12 hours the gravity in the control is about 12.17, after 24 hours about 11.31, after 36 hours about 9.40, after 48 hours about 5.10 and after 60 hours about 3.52.

The addition of penicillin in amounts of 0.05 gamma per ml., 0.10 gamma per ml. and 0.15 gamma per ml. provides for no significant change in the pH values and gravity values. As in Example 6, these additions could not be detected by tests after fermentation is complete, either in the recovered yeast or in the finished ale.

The bacterial infection at the start of the fermentation in the control is about 400 per ml. of gram negative rods. After 12 hours the count is about 80,000, after 24 hours about 280,000, after 48 hours about 220,000 and after 60 hours about 100,000. The reduction in the count between 24 hours and 60 hours is due to the floating away of the bacteria which float to the surface. The settled yeast contains about 111,000 bacteria per ml.

With the addition of the indicated amounts of penicillin, the bacterial count did not significantly vary at the intervals of observation, 12 hours, 24 hours, 48 hours and 60 hours. It is not unlikely that a small amount of the penicillin might have been floated away when the very large dosage of 120 gamma per ml. was used.

The employment of the antibiotic penicillin is seen to have substantially no effect upon the fermentation of ale employing the usual plant technique.

EXAMPLE 8

The effect of the antibiotic polymyxin on an ale fermentation is determined by mixing 3.7 grams of polymyxin with 350 pounds of ale pitching yeast. This quantity of yeast is then pitched into 600 barrels (each barrel of wort contains 31 gallons) of wort and allowed to ferment. A control fermentation containing no polymyxin is run simultaneously. Analysis of the two fermenting ales were run at intervals and the results are presented in table form, as follows:

EFFECT OF POLYMYXIN ON pH OF FERMENTING ALE

| | pH of Fermenting Beer after— | | | | | |
|---|---|---|---|---|---|---|
| | 0 hr. | 6 hr. | 12 hr. | 24 hr. | 36 hr. | End of 60 hr. of Fermentation |
| polymyxin fermenter | 5.03 | 5.01 | 4.96 | 4.74 | 4.30 | 3.94 |
| control fermenter | 4.93 | 4.92 | 4.86 | 4.66 | 4.18 | 3.94 |

| | Reduction in pH after— | | | | |
|---|---|---|---|---|---|
| | 6 hr. | 12 hr. | 24 hr. | 36 hr. | End of 60 hr. of Fermentation |
| polymyxin fermenter | 0.02 | 0.07 | 0.27 | 0.73 | 1.07 |
| control fermenter | 0.01 | 0.07 | 0.27 | 0.75 | 0.99 |

| | Gravity (Degrees Plato) after— | | | | | | | |
|---|---|---|---|---|---|---|---|---|
| | 0 hr. | 6 hr. | 12 hr. | 24 hr. | 36 hr. | 48 hr. | 60 hr. | End of Fermentation |
| polymyxin fermenter | 12.40 | 12.39 | 12.30 | 11.78 | 9.90 | 5.92 | 3.71 | 2.30 |
| control fermenter | 12.30 | 12.30 | 12.17 | 11.31 | 9.40 | 5.10 | 3.52 | 2.20 |

EFFECT OF POLYMYXIN ON pH OF FERMENTING ALE—Continued

|  | Reduction in Gravity (Degrees Plato) after— | | | | | | |
| --- | --- | --- | --- | --- | --- | --- | --- |
|  | 6 hr. | 12 hr. | 24 hr. | 36 hr. | 48 hr. | 60 hr. | Total Decrease |
| polymyxin fermenter | 0.01 | 0.10 | 0.62 | 2.50 | 6.48 | 8.29 | 10.10 |
| control fermenter | 0.00 | 0.13 | 0.99 | 2.90 | 7.20 | 8.78 | 10.10 |

|  | Bacterial Count per ml. after— | | | | | |
| --- | --- | --- | --- | --- | --- | --- |
|  | 0 hr. | 12 hr. | 24 hr. | 48 hr. | 60 hr. | Bacterial Count per ml. of yeast crop |
| polymyxin fermenter | 250 | 2,000 | 3,000 | 3,500 | 520 | 1,200 |
| control fermenter | 375 | 80,000 | 280,000 | 220,000 | 100,000 | 111,000 |

The above data show that polymyxin in this set of fermentations accelerates only slightly the fermentation as measured by reduction in pH and gravity of the fermenting ales. The reason may be that the ale fermentation is a very rapid fermentation as compared to beer fermentation with *S. carlsbergensis*. Also it is carried on at a much higher temperature. The starting temperature of the ale fermentation is 58° F. and it is permitted to go as high as 74° F. This compares with a starting temperature of 48° F. for beer fermentation with a maximum of 58° F. during the fermentation.

The polymyxin, however, effectively reduces the bacterial population of the fermenting ale and the resulting yeast crop.

The polymyxin has no adverse effect on yeast growth during the fermentation.

EXAMPLE 9

An industrial alcohol fermentation is carried out utilizing the yeast *Saccharomyces cerevisiae* or the yeast *Schizosaccharomyces*. Blackstrap from the sugar milling industry containing from about 40 to 55% of fermentable sugar or the conventional rye or bourbon mash is used in preparing the fermentation beer by adjusting the fermentable sugar content to about 12 or 14%, adding the usual amounts of ammonium sulfate, soluble phosphates, and the like as a source of food for the yeast, and adjusting the pH from about 3.5 to about 4.7. The composition of the rye mash or bourbon mash is as set forth at page 231 of Prescott and Dunn, "Industrial Microbiology," McGraw-Hill, 1949. The fermentation with the above yeasts is carried out at a temperature of about 70° F. to about 90° F. for 6 days. The temperature rises during the fermentation as is conventionally found, and the bacterial count per milliliter of yeast crop, starting with about 400 pounds of the yeast to about 16,000 gallons of the beer has a value of about 400,000 after 24 hours in a controlled fermentation under the same conditions whereas the addition of about 4.5 grams of polymyxin to 400 pounds of the yeast *Saccharomyces cerevisiae* reduces the bacterial count to about 3,800 per milliliter of yeast crop. The pH is reduced from a starting pH of about 4.7 to a pH of about 4.0 after 24 hours, and a final pH of about 3.8 is attained after 36 hours in both the control fermentation and the polymyxin fermentation but the gravity reduction is slightly greater with the polymyxin fermentation than in the control fermentation, particularly after 24 hours to indicate a perceptible synergistic effect of the polymyxin in the stimulation of the yeast growth.

The delayed action of the polymyxin in reducing the bacterial count is similar to that encountered in the fermentation of beer and of ale. The disappearance of bacteria which are occluded by or absorbed on the yeast after the induction period which lasts from 2 to 3 days provides a remarkably efficient control at the end of the fermentation where the control is really needed in order to eliminate undesirable micro-organisms.

EXAMPLE 10

An industrial alcohol fermentation substituting penicillin in place of polymyxin, the dosages of penicillin being 0.05 gamma per ml., 0.10 gamma per ml., 0.15 gamma per ml., and 120 gamma per ml. is carried out as in Example 9. No substantial effect is had with penicillin in these dosages with respect to either the bacterial count (gram negative rods), the reduction in pH and the reduction in gravity as compared with the control as set forth in Example 9. Penicillin provides no advantage when used alone.

EXAMPLE 11

A beer fermentation under the conditions as in Example 1 is carried out except that penicillin and polymyxin are added (0.05 gamma per ml. of polymyxin and 0.10 gamma per ml. penicillin) to give 0.15 gamma per ml. of fermenting beer. The mixture is added to the pitching yeast just prior to pitching. The results of the analysis of this fermenter and a control fermenter are presented in Table II. This combination effectively eliminates the bacteria, stimulates the fermentation as measured by pH reduction and reduction in gravity of the fermenting beer and does not affect yeast growth.

TABLE II

*Comparison of beer fermentation with polymyxin (.05 gamma per ml.) and penicillin (0.10 gamma per ml.) and control in Example 11*

| Hours after pitching | Yeast Count | | pH | | Degrees Plato | | Count (Bacterial) | |
| --- | --- | --- | --- | --- | --- | --- | --- | --- |
|  | Mixture | Control | Mixture | Control | Mixture | Control | Mixture | Control |
| 0 | 6.2 | 6.4 | 5.10 | 5.10 | 12.3 | 12.3 | 132,000 | 145,000 |
| 24 | 24.7 | 19.5 | 4.61 | 4.74 | 11.5 | 11.6 | 1,200 | 460,000 |
| 48 | 42.2 | 43.4 | 4.31 | 4.50 | 9.5 | 10.4 | 0 | 790,000 |
| 72 | 40.1 | 46.2 | 4.02 | 4.20 | 5.3 | 7.0 | 0 | 510,000 |
| 96 | 24.9 | 23.6 | 4.00 | 4.15 | 3.7 | 3.9 | 0 | 140,000 |
| 120 | 2.8 | 4.1 | 4.01 | 4.18 | 3.1 | 3.1 | 0 | 130,000 |

Although the quantities of the two antibiotics added were 0.10 gamma of penicillin and 0.05 gamma of polymyxin per ml., an assay of the end-fermented beer showed that it contained less than 0.05 gamma per ml. of penicillin (the lower limit of the assay). No polymyxin could be found either but the quantity added is below the concentration that can be assayed for.

EXAMPLE 12

This example is carried out in exactly the same manner as Example 8 except that 3.7 grams of polymyxin is replaced by 2.4 grams of penicillin admixed with 1.2 grams of polymyxin. A control fermentation containing no polymyxin is run simultaneously. Analysis of the two fermenting ales were run at intervals and the results are presented in table form, as follows:

EFFECT OF PENICILLIN AND POLYMYXIN ON pH OF FERMENTING ALE

|  | pH of Fermenting Beer after— | | | | | |
|---|---|---|---|---|---|---|
|  | 0 hr. | 6 hr. | 12 hr. | 24 hr. | 36 hr. | End of 60 hr. of Fermentation |
| polymyxin+penicillin | 5.03 | 5.01 | 4.97 | 4.73 | 4.29 | 3.93 |
| control fermenter | 4.93 | 4.92 | 4.86 | 4.66 | 4.18 | 3.94 |

|  | Reduction in pH after— | | | | |
|---|---|---|---|---|---|
|  | 6 hr. | 12 hr. | 24 hr. | 36 hr. | End of 60 hr. of Fermentation |
| polymyxin+penicillin | 0.02 | 0.06 | 0.30 | 0.74 | 1.09 |
| control fermenter | 0.01 | 0.07 | 0.27 | 0.75 | 0.99 |

|  | Gravity (Degrees Plato) after— | | | | | | | |
|---|---|---|---|---|---|---|---|---|
|  | 0 hr. | 6 hr. | 12 hr. | 24 hr. | 36 hr. | 48 hr. | 60 hr. | End of Fermentation |
| polymyxin+penicillin | 12.40 | 12.38 | 12.29 | 11.77 | 9.88 | 5.90 | 3.70 | 2.30 |
| Control fermenter | 12.30 | 12.30 | 12.17 | 11.31 | 9.40 | 5.10 | 3.52 | 2.20 |

|  | Reduction in Gravity (Degrees Plato) after— | | | | | | |
|---|---|---|---|---|---|---|---|
|  | 6 hr. | 12 hr. | 24 hr. | 36 hr. | 48 hr. | 60 hr. | Total Decrease |
| polymyxin+penicillin | 0.02 | 0.11 | 0.63 | 2.51 | 6.50 | 8.70 | 10.11 |
| control fermenter | 0.00 | 0.13 | 0.88 | 2.90 | 7.20 | 8.78 | 10.10 |

|  | Bacterial Count per ml. after— | | | | | |
|---|---|---|---|---|---|---|
|  | 0 hr. | 12 hr. | 24 hr. | 48 hr. | 60 hr. | Bacterial Count per ml. of yeast crop |
| polymyxin+penicillin | 410 | 1,800 | 3,000 | 3400 | 580 | 1,100 |
| control fermenter | 410 | 90,000 | 285,000 | 230,000 | 101,000 | 111,000 |

The above data show a small but significant improvement in the effect of polymyxin and penicillin, as compared with polymyxin in the same dosage and is applied in the fermentation of ale. The improvement with respect to the control is at least as good as with polymixin alone. In view of the ineffectiveness of penicillin alone, in varying dosages, the effectiveness of the combination of penicillin and polymyxin is indeed surprising, even under conditions of shorter time and higher temperatures as employed in ale fermentation, and under the acid conditions which tend to inhibit bacteria in malt fermentations.

The necessity for flowing the floating bacteria off the top of the ale during fermentation is obviated, and further, adding the mixture of penicillin and polymyxin to the wort after cooling provides for the improved separation of the trub.

EXAMPLE 13

This example is carried out in exactly the same manner as Example 9 except that 4.5 grams of polymyxin to 400 pounds of yeast is replaced by 3.0 grams of penicillin and 1.5 grams of polymyxin for the same amount of yeast.

The fermentation of the rye or burbon mash is carried out at a temperature of about 70° F. to about 90° F., the temperature being permitted to rise. The time is 6 days. The bacterial count rises from about 500 per ml., initial, to about 400,000 per ml. after 24 hours in the control as in Example 9. The addition of 3.0 grams of penicillin and 1.5 grams of polymyxin to 400 pounds of yeast (16,000 gallons of mash) reduces the bacterial count to about 2,500 per ml. after 24 hours.

A slightly greater reduction in pH is obtained after 24 hours and after 36 hours than with the control carried out in the absence of any antibiotic. The pH reduction is slightly better than with polymyxin used as in Example 9.

The reduction in gravity after 24 hours and after 36 hours is at least as good as the reduction in gravity which is encountered with the use of polymyxin in the mash.

The bacterial count remains below 2,000 for the last 4 days of fermentation. The elimination of undesirable odors and flavors as is found with polymyxin is likewise found with the use of the mixture of polymyxin and penicillin. The perceptible synergistic effect in the stimulation of yeast growth is found with the mixture but a further improvement is obtained in providing for an even lower bacterial contamination at the end of the fermentation of the mash, so as to provide an even greater improvement than obtained with the use of polymyxin.

In each of the above examples, the antibiotics are added as pure materials in the form in which they are commercially available. It is preferred that the antibiotics be as pure as it is possible to obtain them since the control of the fermentation process requires a minimum disturbance of the fermenting activity of the yeast as it reacts with the fermentable liquid medium. Further, it is desired to avoid additional unit operations such as filtering or clarification in the plant, since it has been found that these can be obviated by very careful attention to purity of materials and cleanliness in operation. Keeping these requirements in mind, the invention also includes the use of the combination of penicillin and polymyxin associated with a carrier which may be either a sterile solid material or a sterile aqueous liquid. Such solid carriers as diatomaceous earth, activated carbon, talc or the like may be used. The composition associated either with a liquid sterile material or with a solid sterile carrier preferably contains not less than about 1.5 grams of polymyxin and about 3.0 grams of penicillin for use in a fermentation requiring about 400 pounds of yeast. Based upon 100 pounds of yeast, the composition contains about 0.4 gram of polymyxin and about 0.75 gram of penicillin. The yeast requirement is well known and understood in the fermentation of malt beverages and whiskey mashes. Expressing the unit dosage of the antibiotics, polymyxin and penicillin, in terms of these yeast requirements for these fermentations affords a simple and easy means for controlling the activity of the yeast in these fermentations, even though the antibiotics may be added to the wort or mash before pitching with yeast or after pitching, or to the yeast per se.

The filtration of the beer, ale or mash permits the separation of a solid residue containing the yeast and mixed antibiotics which have excellent values as an animal and poultry feed. The vegetable residue contains a growth promoting factor associated with the yeast and polymyxin and the vitamins associated with the yeast. The residue may be used as a feeding supplement with all vegetable protein such as those derived from soybean meal, peanut meal and the like.

A reference to pH reduction during a normal beer fermentation and its relationship to the increase in alcohol production can be found in a paper entitled: Experiments on Bottom Fermentation 1. Methodology, by Erik Helm and Birger Trolle, Wallerstein Laboratories Communications 10, 87–98 (1947).

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described being merely preferred embodiments thereof.

What we claim is:

1. A method of stimulating the yeast fermentation of beer and inactivating *Flavobacterium proteus* and related gram negative organisms in the fermentation medium in brewing operations comprising adding the antibiotics polymyxin and penicillin to the beer fermentation medium each in an amount of at least 0.5 gamma per milliliter at the start of the fermentation, whereby unfavorable flavors and odors are suppressed and the rate of fermentation is increased.

2. A method of stimulating the yeast fermentation of ale and inactivating *Flavobacterium proteus* and related gram negative organisms in the fermentation medium in brewing operations comprising adding the antibiotics polymyxin and penicillin to the fermentation medium each in an amount of at least 0.05 gamma per milliliter at the start of the fermentation whereby unfavorable flavors and odors are suppressed and the rate of fermentation is increased.

3. A yeast composition adapted for the fermentation of beer in brewery operations comprising essentially brewers yeast in admixture with polymyxin and penicillin each in an amount between 1 and 4000 gammas per milliliter of said yeast.

4. A yeast composition adapted for the fermentation of beer in brewery operations comprising essentially *Saccharomyces cerevisiae* in admixture with polymyxin and penicillin each in an amount between 1 and 4000 gammas per milliliter of said yeast.

5. A composition in dosage unit form for stimulating the yeast fermentation of beer, ale, or industrial alcohol comprising not less than about 0.4 gram of polymyxin and about 0.75 gram of penicillin per 100 pounds of yeast used in said fermentation and a sterile carrier therefor.

6. In a method of separating trub from the wort after heating in the preparation of malt beverages, that improvement consisting essentially of adding at least about 0.05 gamma of polymyxin per milliliter of wort to the wort while cooling and in the absence of starter yeast.

7. In a method of separating trub from the wort after heating in the preparation of malt beverages, that improvement consisting essentially of adding at least about 0.05 gamma of polymyxin and about 0.10 gamma of penicillin per milliliter of wort to the wort while cooling and in the absence of starter yeast.

References Cited in the file of this patent

FOREIGN PATENTS 905,075  France _____ Apr. 3, 1945

OTHER REFERENCES

Wallerstein Laboratories "Communications," August 1946, vol. IX, No. 27, pages 115–127.

Journal American Chemical Society, vol. 74, No. 24, December 20, 1952, pages 6304–6305, article by W. D. Celmer et al.

Hesseltine et al. Ser. No. 228,296; abstract published in volume 674 O.G. 1368 September 29, 1953.